(12) United States Patent
Mak et al.

(10) Patent No.: US 12,228,747 B2
(45) Date of Patent: Feb. 18, 2025

(54) CAMERA STABILIZER MODULE

(71) Applicant: VISTA INNOTECH LIMITED, Hong Kong (HK)

(72) Inventors: Lin Chi Mak, Hong Kong (HK); Jing Li, Hong Kong (HK)

(73) Assignee: VISTA INNOTECH LIMITED, Hong Kong (HK)

( * ) Notice: Subject to any disclaimer, the term of this patent is extended or adjusted under 35 U.S.C. 154(b) by 152 days.

(21) Appl. No.: 18/185,916

(22) Filed: Mar. 17, 2023

(65) Prior Publication Data

US 2023/0296913 A1    Sep. 21, 2023

(51) Int. Cl.
  *G02B 27/64*  (2006.01)
  *H04N 23/54*  (2023.01)
  *H04N 23/68*  (2023.01)

(52) U.S. Cl.
  CPC .......... *G02B 27/648* (2013.01); *H04N 23/54* (2023.01); *H04N 23/687* (2023.01)

(58) Field of Classification Search
  CPC ...... H04N 23/54; H04N 23/687; H04N 23/60; H04N 23/68; H04N 23/682; H04N 23/685; G03B 5/00; G03B 30/00; G02B 27/648; G02B 27/64; G02B 27/646
  See application file for complete search history.

(56) References Cited

U.S. PATENT DOCUMENTS

| | | | | |
|---|---|---|---|---|
| 2007/0077805 | A1* | 4/2007 | Nomura | H04N 23/68 |
| | | | | 348/E5.046 |
| 2012/0219275 | A1* | 8/2012 | Suzuka | G03B 5/00 |
| | | | | 396/55 |
| 2015/0237259 | A1* | 8/2015 | Yasuda | G02B 27/646 |
| | | | | 348/208.11 |
| 2016/0357027 | A1* | 12/2016 | Izumi | G02B 27/64 |
| 2018/0284566 | A1* | 10/2018 | Minamisawa | H04N 23/54 |
| 2018/0284569 | A1* | 10/2018 | Minamisawa | G02B 27/646 |
| 2022/0404635 | A1* | 12/2022 | Uno | G03B 5/00 |

FOREIGN PATENT DOCUMENTS

CN      111664324 A      9/2020

* cited by examiner

*Primary Examiner* — Kelly L Jerabek

(57) ABSTRACT

A camera stabilizer module includes a fixed structure including at least two split outer ball seats, where rotating fulcrums are provided on each of the outer ball seats, and there are at least four rotating fulcrums in total; a first circuit board provided with a fixed portion, an elastic portion and a connecting portion that are sequentially connected; a plurality of balls quantitatively consistent with the rotating fulcrums and rotatably connected to the rotating fulcrums in one-to-one correspondence; a movable structure provided in the outer ball seats; and a driving structure capable of driving the movable structure to rotate around at least two rotational axes.

21 Claims, 15 Drawing Sheets

CAMERA STABILIZER MODULE

CROSS REFERENCE TO RELATED APPLICATIONS

The present application claims the benefit of Chinese Patent Application No. 202210269479.3 filed on Mar. 18, 2022, the contents of which are incorporated herein by reference in their entirety.

TECHNICAL FIELD

The present application relates to a camera stabilizer module.

BACKGROUND

In recent years, compact mobile devices having a photographing function, including drones, action cameras, and car camcorder, have been popularized and applied to more fields. These mobile devices include camera modules, so the market for the camera modules is huge.

When the mobile devices are used to take photos or videos, the photos or videos are prone to blur due to external vibrations, with an undesirable quality. This problem is particularly severe in the case of intense vibrations or low-light scenarios.

In order to solve above problems, some compact stabilizers are emerging in markets. Using a mechanical stabilizer is considered as the best way to counteract the external vibrations. Specifically, the mechanical stabilizer is used to shift and/or rotate a lens and an image sensor through an actuator, thereby achieving the stabilization effect.

In the prior art, the ball-type camera stabilizer module (refer to the patent application CN 111664324 A) can implement multi-axis rotational degrees-of-freedom (DOF) and has been widely applied. With a high spring constant in translation, the stabilization effect of the ball-type camera stabilizer module is less impacted by posture change and changes in direction of the gravitational force. However, as described in the patent application CN111664324A, an outer seat is rotatably connected to an inner seat through a group of balls. There are two balls above a center of rotation, and two balls below the center of rotation. When the outer seat and the rotary structure are assembled, an interference is unavoidable. Particularly in the case of a large included angle between a tangent plane where the inner seat contacts the ball and an optical axis of the lens, the assembly is too difficult to implement mass production.

SUMMARY

An objective of the present application is to provide a camera stabilizer module, which not only can provide multi-axis DOF to reduce impact from posture changes on stabilizing performance, and but also can effectively lower an assembly difficulty for mass production.

The objective of the present application is achieved by following technical solutions.

The present application provides a camera stabilizer module, including:

a fixed structure including at least two split outer ball seats, where the at least two outer ball seats are connected to jointly define a through hole, rotating fulcrums are provided on each of the outer ball seats, and there are at least four rotating fulcrums in total that are located in the through hole;

a first circuit board provided with a fixed portion, an elastic portion and a connecting portion that are sequentially connected, the fixed portion being connected to the fixed structure;

a connecting structure including a plurality of balls, which are quantitatively consistent with the rotating fulcrums, and rotatably connected to the rotating fulcrums in one-to-one correspondence;

a movable structure inserted into the through hole, where a bottom of the movable structure is connected to the connecting portion, the movable structure includes an inner ball seat and a lens on the inner ball seat, at least four spherical segments in one-to-one correspondence with the balls are arranged on an outer periphery of the inner ball seat, the spherical segments are concentric with a center of rotation, and the balls abut against the spherical segments; and a driving structure capable of driving the movable structure to rotate around at least two rotational axes.

In some embodiments of the present application, the fixed structure may include two vertically stacked outer ball seats, a vertical opening may be formed in each of the outer ball seats, the two openings may be aligned with each other to define the through hole, and the outer ball seats each may be provided thereon with at least two rotating fulcrums; and a plane passing through the center of rotation and perpendicular to an optical axis of the lens may be defined as a first reference plane, the rotating fulcrums on the upper outer ball seat may be located above the first reference plane, and the rotating fulcrums on the lower outer ball seat may be located below the first reference plane.

In some embodiments of the present application, the spherical segments each may have a same diameter; the outer ball seats each may be provided thereon with two rotating fulcrums; and included angles between tangent planes at places where the spherical segments may contact the balls and the optical axis of the lens may be the same; and from a top view, the two rotating fulcrums on the upper outer ball seat and the center of rotation may be located on a first reference straight line, and the two rotating fulcrums on the lower outer ball seat and the center of rotation may be located on a second reference straight line, where the first reference straight line may be perpendicular to the second reference straight line.

In some embodiments of the present application, the outer ball seats each may include:

a base, the opening being formed in the base; and at least two clamping portions connected to the opening of the base, where grooves may be formed in the clamping portions, the balls may be provided in the grooves, and the rotating fulcrums may be defined on inner wall surfaces of the grooves; and the two bases may be vertically stacked.

In some embodiments of the present application, at least one of the clamping portions may be configured to:

suspend in the opening through an elastic arm, where the elastic arm may include one end connected to the base, and the other end connected to the clamping portion, and may satisfy a relationship: L≥4t, where L represents a length of the elastic arm, and t represents a thickness of the elastic arm.

In some embodiments of the present application, a stopper may be provided on at least one of the outer ball seats, a notch may be formed in the outer periphery of the inner ball seat, and the stopper may be cooperated with the notch to limit an angle of rotation of the movable structure relative to the fixed structure.

In some embodiments of the present application, the driving structure may include at least two actuators, and the at least two actuators may be circumferentially spaced apart along the outer periphery of the inner ball seat; and each of the actuators may include a coil and a magnet that may be opposite to each other, and the coil and the magnet may be provided on an inner peripheral wall of the through hole and an outer peripheral wall of the inner ball seat, respectively.

In some embodiments of the present application, the magnet may be provided on the inner peripheral wall of the through hole, and the coil may be provided on the outer peripheral wall of the inner ball seat.

In some embodiments of the present application, in each of the actuators, the magnet may cover the coil completely, and an outer edge of the magnet may protrude from an outer edge of the coil.

In some embodiments of the present application, at least one of the actuators may further include a metal sheet, the metal sheet may be provided on the outer peripheral wall of the inner ball seat, and the metal sheet may be provided on an outer periphery and/or an inner periphery of the coil.

In some embodiments of the present application, the movable structure may further include:

a second circuit board below the lens, and including a bottom surface connected to the connecting portion mechanically and electrically, and a top surface provided with an image sensor.

In some embodiments of the present application, the lens may include:

a lens mount connected to an inner periphery of the inner ball seat; and an optical unit passing through an inner periphery of the lens mount, the image sensor being opposite to the optical unit.

In some embodiments of the present application, the movable structure may further include:

a third circuit board provided on an outer periphery of the inner ball seat, and electrically connected to the second circuit board, a position sensor and/or an inertial measurement unit being arranged on the third circuit board.

In some embodiments of the present application, the third circuit board may include:

an enclosure frame lapped on a top end surface of the inner ball seat; and a plurality of extension arms circumferentially spaced apart on the outer periphery of the inner ball seat, upper ends of the extension arms being connected to the enclosure frame, and an outer side of each of the extension arms being provided with the position sensor.

In some embodiments of the present application, a plurality of clamping slots in one-to-one correspondence with the extension arms may be formed in an outer peripheral wall of the inner ball seat, tops of the clamping slots may extend through a top surface of the inner ball seat, and the extension arms may be accommodated in the clamping slots.

In some embodiments of the present application, the third circuit board may further include:

a lower extension plate circumferentially staggered with the extension arms, where the lower extension plate may include a lateral plate and an end plate that may be sequentially connected; a top side of the lateral plate may be connected to the enclosure frame; one side of the end plate may be connected to a bottom side of the lateral plate, and extend along a radial direction of the lens; the lateral plate may be attached to the outer peripheral wall of the inner ball seat; the end plate may be attached to the bottom surface of the second circuit board; and an outer side of the lateral plate may be provided with the inertial measurement unit.

In some embodiments of the present application, the fixed structure may further include:

a housing provided therein with a mounting cavity, where a through hole aligned with the mounting cavity is formed in a top of the housing; the at least two outer ball seats and the first circuit board are provided in the mounting cavity of the housing; and the lens may be inserted into the through hole.

In some embodiments of the present application, the housing may include:

a lower housing body; and an upper housing body covering a top of the lower housing body, the mounting cavity being defined between the upper housing body and the lower housing body, where a part of the fixed portion may be clamped between the upper housing body and the lower housing body.

In some embodiments of the present application, a part of the fixed portion may be stretched out of the housing, and an outer region of the fixed portion stretched out of the housing may be provided with a socket.

In some embodiments of the present application, the elastic portion may include:

at least two elastic wires located on a second reference plane, each of the elastic wires including one end connected to the fixed portion, and the other end connected to the connecting portion, and including at least two connecting segments sequentially connected in a bending manner; and the second reference plane may be perpendicular to the optical axis of the lens.

In some embodiments of the present application, the at least two spaced-apart elastic wires may be symmetrically distributed at two sides of the connecting portion; and the second reference plane may be perpendicular to an optical axis of the lens.

In some embodiments of the present application, a passage hole may be formed outside the housing, the passage hole may be aligned with the mounting cavity, and the elastic portion may include:

an elastic plate including one end connected to the fixed portion, and the other end connected to the connecting portion, and including a first plate body and a second plate body that may be sequentially connected, where a plane of the first plate body may be parallel to an optical axis of the lens, a plane of the second plate body may be perpendicular to the optical axis, one side of the first plate body may be connected to the fixed portion; the other side of the first plate body may be connected to one side of the second plate body, the other side of the second plate body may be connected to the connecting portion, and the second plate body may be provided in the passage hole.

In some embodiments of the present application, the first plate body may include two wall surfaces that may be sequentially connected, and the two wall surfaces may be perpendicular to each other.

According to the camera stabilizer module provided by the present application, a fixed structure is rotatably connected to a movable structure through a first circuit board with an elastic portion and at least four balls. Under an action of a driving structure, the movable structure can rotate multiaxially relative to the fixed structure, and different postures have a low impact on the stabilizing performance. In addition, the fixed structure includes at least two split outer ball seats, and each of the outer ball seats is provided thereon with rotating fulcrums connected to the balls. In response to assembly, the outer ball seats are sequentially provided on an outer periphery of the movable structure through the balls, and then assembled with other components, thereby effectively reducing the assembly difficulty for mass production of the product.

BRIEF DESCRIPTION OF THE DRAWINGS

The present application will be further described in detail below with reference to the drawings and preferred embodiments. However, those skilled in the art should understand that these drawings are drawn only for the purpose of explaining the preferred embodiments, and therefore should not be construed as a limitation to the scope of the present application. In addition, unless otherwise specified, the drawings are only intended to conceptually represent the composition or configuration of the described objects and may include exaggerated displays, and the drawings are not necessarily drawn to scale.

Figure 1:
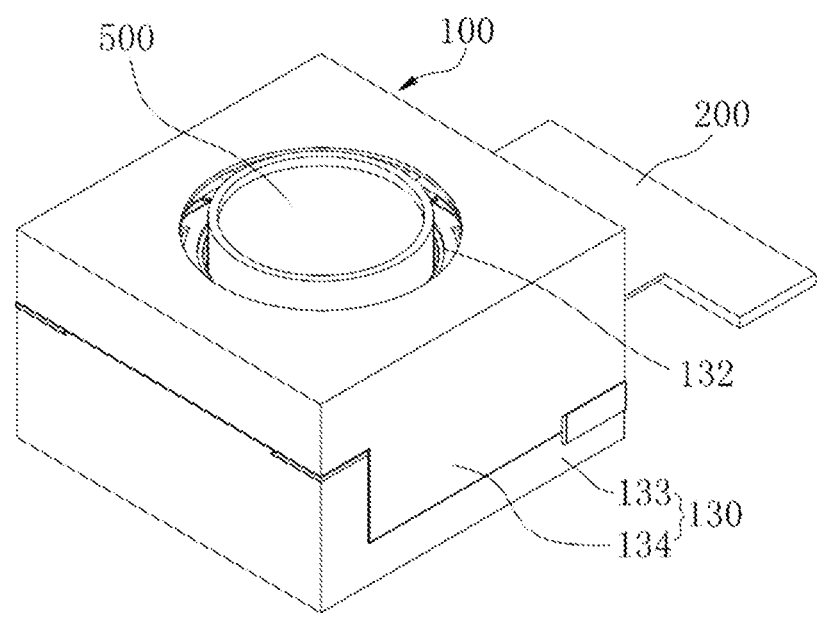
FIG. 1 is a structural view of a camera stabilizer module according to an embodiment of the present application.
Figure 2:
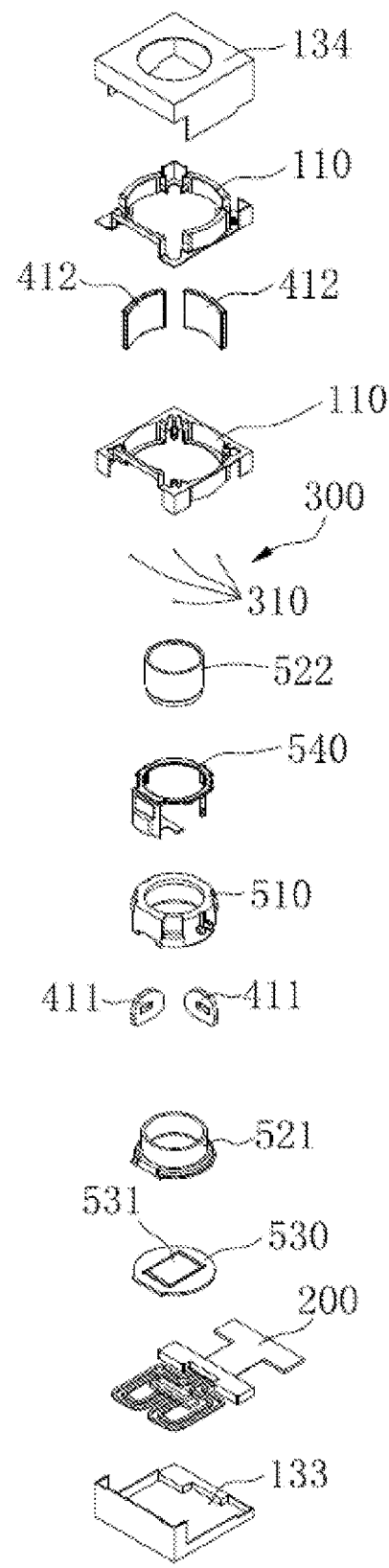
FIG. 2 is an exploded view of FIG. 1.

In the figures:
- 100: fixed structure, 110: outer ball seat, 111: rotating fulcrum, 112: base, 1121: opening, 113: clamping portion, 1131: groove, 114: elastic arm, 115: stopper, 120: through hole, 130: housing, 131: mounting cavity, 132: through hole, 133: lower housing body, 134: upper housing body, and 135: passage hole;
- 200: first circuit board, 210: fixed portion, 211: socket, 220: elastic portion, 221: elastic wire, 2211: connecting segment, 222: elastic plate, 2221: first plate body, 2221a: wall surface, 2222: second plate body, and 230: connecting portion;
- 300: connecting structure, and 310: ball;
- 400: driving structure, 410: actuator, 411: coil, 412: magnet, and 413: metal sheet;
- 500: movable structure, 510: inner ball seat, 511: spherical segment, 512: notch, 513: clamping slot, 520: lens, 521: lens mount, 522: optical unit, 530: second circuit board, 531: image sensor, 540: third circuit board, 541: position sensor, 542: inertial measurement unit, 543: enclosure frame, 544: extension frame, 545: lower extension plate, 5451: lateral plate, and 5452: end plate; and
- X: first reference straight line, Y: second reference straight line, Z: optical axis of the lens, and a: reference sphere.

DETAILED DESCRIPTION OF THE EMBODIMENTS

The preferred embodiment of the present application will be described in detail below with reference to the accompanying drawing. It is to be understood by those skilled in the art that the descriptions are only illustrative and exemplary, and should not be construed as a limitation to the protection scope of the present application.

It is to be noted that orientations such as top, bottom, upward and downward used herein are defined based on the directions in the drawings. They are relative concepts and thus can change according to different positions and different using states. These or other orientations should not be construed as limiting terms.

It is to be noted that the term "include" does not exclude other elements or steps, and the term "a" or "an" does not exclude a plural form.

In addition, it is further to be noted that, for any single technical feature described or implied in the embodiments of the present application, or any single technical feature illustrated or implied in the accompanying drawings, these technical features (or equivalents thereof) can still be combined to obtain other embodiments not directly mentioned in the present application.

It should be understood that the terms such as "first", "second", and the like are used in the present application to describe various information, but the information should not be limited to these terms, and these terms are only used to distinguish the same type of information from each other. For example, without departing from the scope of the present application, "first" information may be referred to as "second" information, and similarly, "second" information may be referred to as "first" information.

It is to be noted that the same reference numeral refers to the same or approximately the same component in different drawings.

As shown in FIGS. 1-15, an embodiment of the present application provides a camera stabilizer module, including: a fixed structure 100, a first circuit board 200, a connecting structure 300, a movable structure 500, and a driving structure 400.

The fixed structure 100 includes two outer ball seats 110. The two outer ball seats 110 are not formed integrally, namely the two outer ball seats 110 are of a split-type overall, and can be separated from each other. The two outer ball seats 110 are vertically stacked and connected. A vertical opening 1121 is formed in each of the outer ball seats 110. The two openings 1121 are aligned with each other to define a vertically through hole 120. Two rotating fulcrums 111 are provided on each of the outer ball seats 110, namely there are four rotating fulcrums 111 in total that are located in the through hole 120. The first circuit board 200 is provided with a fixed portion 210, an elastic portion 220 and a connecting portion 230 that are sequentially connected. The fixed portion 210 is connected to the fixed structure 100. The connecting structure 300 includes four balls 310 rotatably connected to the rotating fulcrums 111 in one-to-one correspondence. The movable structure 500 is inserted into the through hole 120. A bottom of the movable structure 500 is connected to the connecting portion 230. The movable structure 500 includes an inner ball seat 510 and a lens 520 on the inner ball seat 510. At least four spherical segments 511 in one-to-one correspondence with the balls 310 are arranged on an outer periphery of the inner ball seat 510. The spherical segments 511 are concentric with a center of rotation. The center of rotation passes through an optical axis Z of the lens 520. The balls 310 abut against the spherical segments 511. The driving structure 400 is capable of driving the movable structure 500 to rotate around at least two rotational axes. Each rotational axis passes through or approximately passes through the center of rotation. A distance between the rotational axis and the center of rotation is less than a maximum size of an upper housing body 134.

Based on the above structure, in case of an external vibration during specific operation, the driving structure 400 drives the movable structure 500 to rotate relative to the fixed structure 100. When the rotation has a same amplitude but an opposite direction with the external vibration, the external vibration can be counteracted to implement stabilization. Four balls 310 are provided between the two outer ball seats 110 and the inner ball seat 510, and the four balls 310 abut against the four concentric spherical segments 511 on the inner ball seat 510 in one-to-one correspondence, which can implement multi-axis rotational stabilization (the direction of a rotational axis can be specifically determined according to a direction of a driving force applied by the driving structure 400 to the movable structure 500). The four balls 310 can support the movable structure 500 stably and reliably, thereby reducing the impact of posture changes on stabilizing performance. The first circuit board 200 is an elastic circuit board, and is connected to the bottom of the movable structure 500 and the fixed structure 100, such that the damping effect can be achieved in movement of the stabilizer, and the movable structure 500 can be restored automatically upon completion of the movement of the stabilizer. In addition, there are two split outer ball seats 110, and the two outer ball seats 110 each are provided thereon with two rotating fulcrums 111 rotatably connected to the balls 310. In response to assembly, the two outer ball seats 110 can be sequentially connected to the outer periphery of the inner ball seat 510 through the balls 310 from the top down or from the bottom up, which is simple, and convenient for mass production of the product.

In some embodiments of the present application, the through hole 120 may be of a laterally through hole shape or an obliquely through hole shape according to actual needs, which is not defined in the present application.

In some preferred embodiments of the present application, as shown in FIGS. 2-5, in order to assemble the outer ball seats 110 and the inner ball seat 510 more conveniently, and support the movable structure 500 stably such that the movable structure 500 is less impacted by posture changes in multi-axis stabilizing rotation, a plane passing through the center of rotation and perpendicular to the optical axis Z of the lens 520 is defined as a first reference plane, the rotating fulcrums 111 on the upper outer ball seat 110 are located above the first reference plane, and the rotating fulcrums 111 on the lower outer ball seat 110 are located below the first reference plane.

Figure 3:
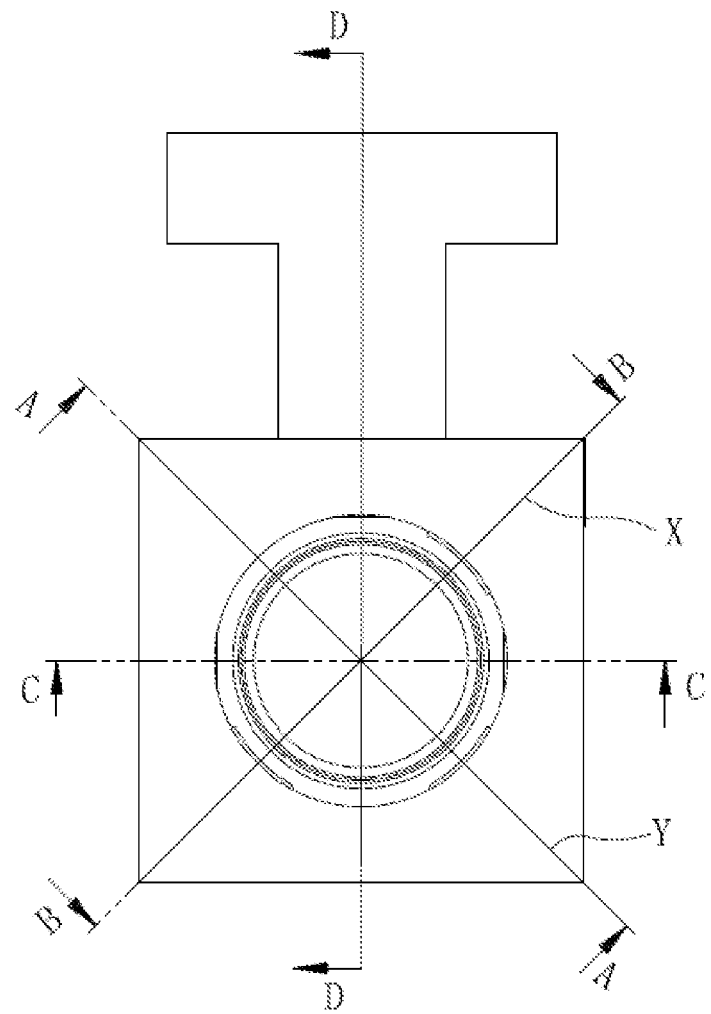
FIG. 3 is a top view of a camera stabilizer module according to an embodiment of the present application.
Figure 4:
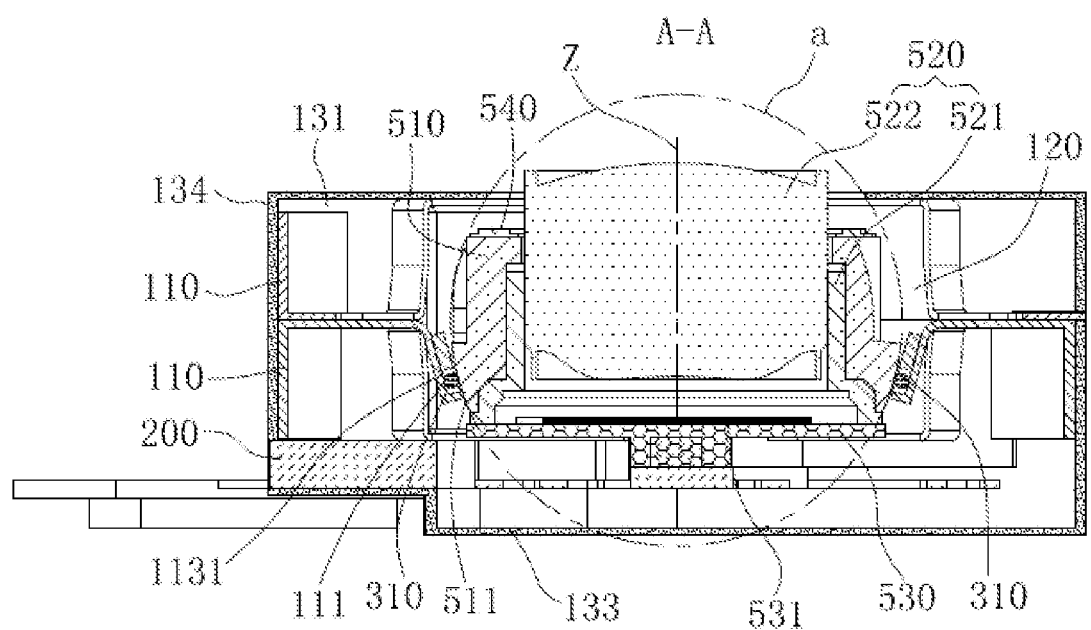
FIG. 4 is an A-A sectional view of FIG. 3.
Figure 5:
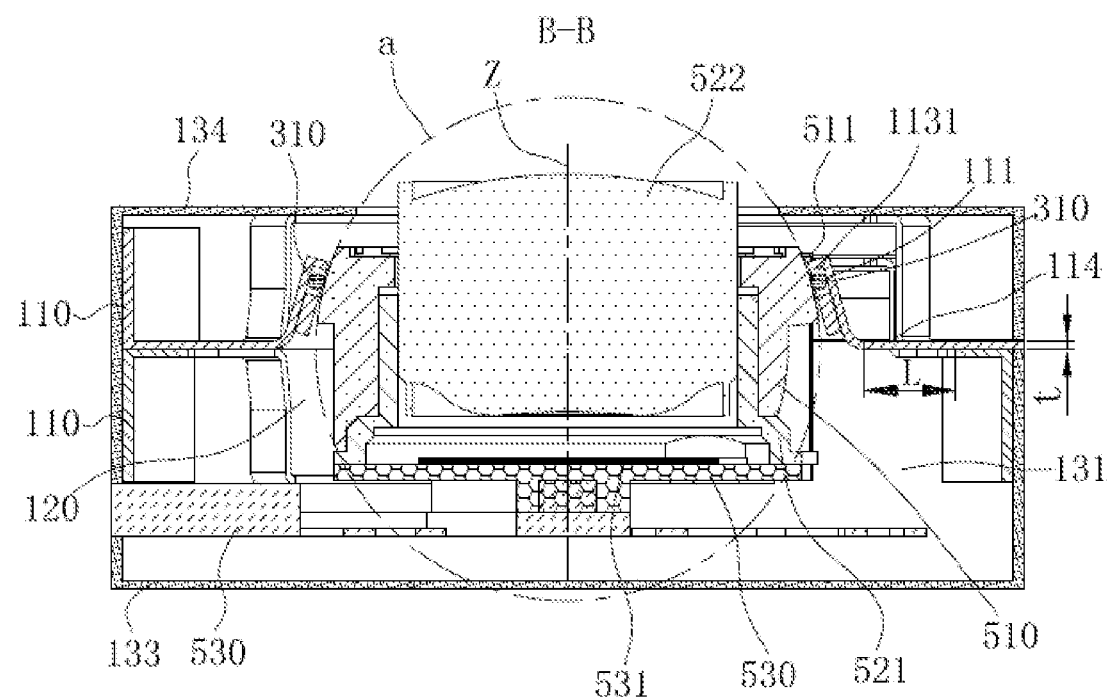
FIG. 5 is a B-B sectional view of FIG. 3.

Further preferably, as shown in FIG. 4 and FIG. 5, the spherical segments 511 each have a same diameter, namely the spherical segments 511 are all located on a same reference sphere a. Included angles β (not specifically shown in the figures) between tangent planes at places where the spherical segments 511 contact the balls 310 and the optical axis Z of the lens 520 are the same, as shown in FIG. 5. As shown in FIG. 3, from a top view, the two rotating fulcrums 111 on the upper outer ball seat 110 and the center of rotation are located on a first reference straight line X, and the two rotating fulcrums 111 on the lower outer ball seat 110 and the center of rotation are located on a second reference straight line Y. The first reference straight line X is perpendicular to the second reference straight line Y. Based on the structure, in case of a large included angle β, the assembly difficulty can be reduced effectively, and the desirable multi-axis stabilizing effect can be achieved.

In some embodiments of the present application, it is to be noted that the spherical segments 511 may have different diameters, provided that the spherical segments 511 are concentric.

Figure 8:
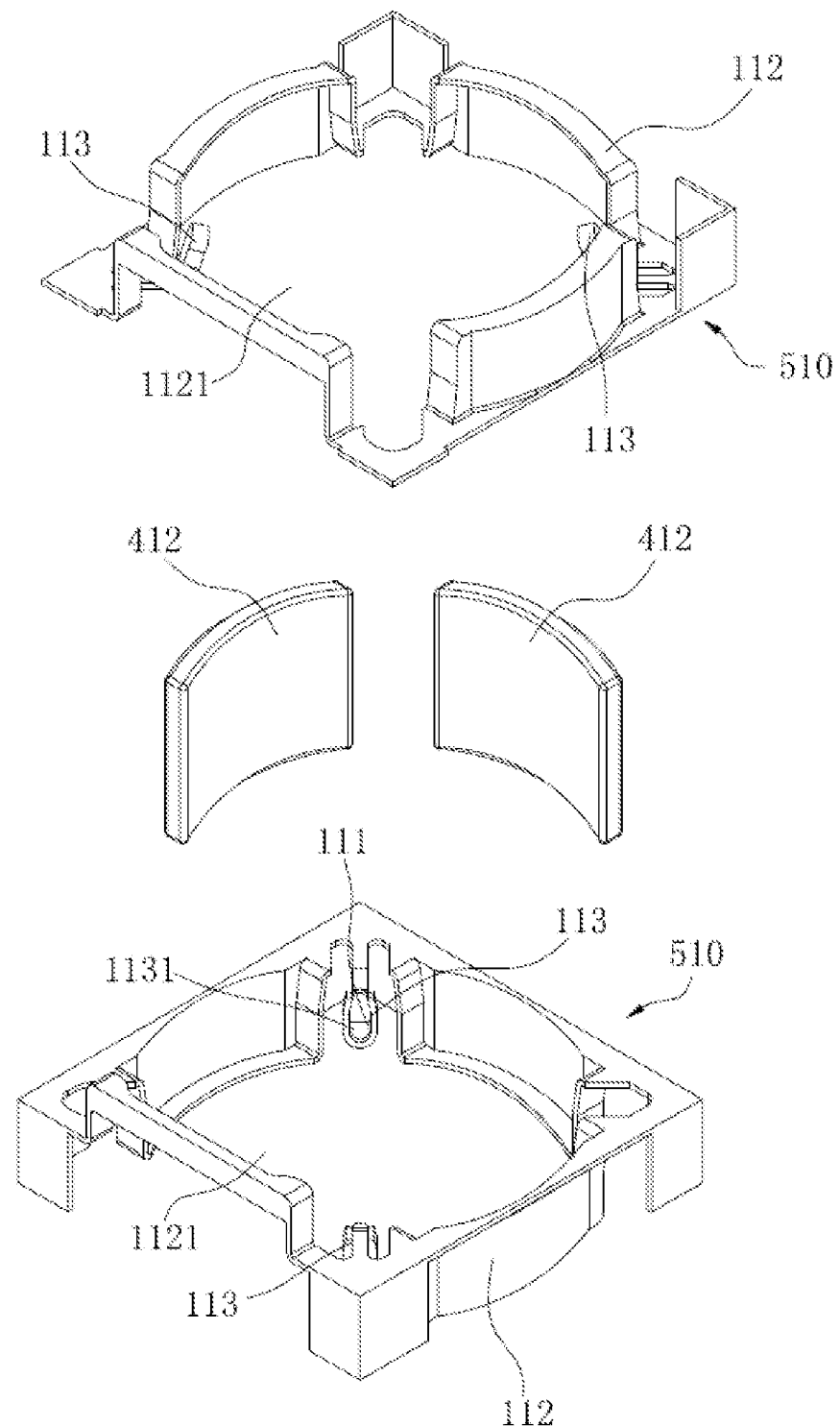
FIG. 8 is an exploded view between an outer ball seat and a magnet in FIG. 1.
Figure 9:
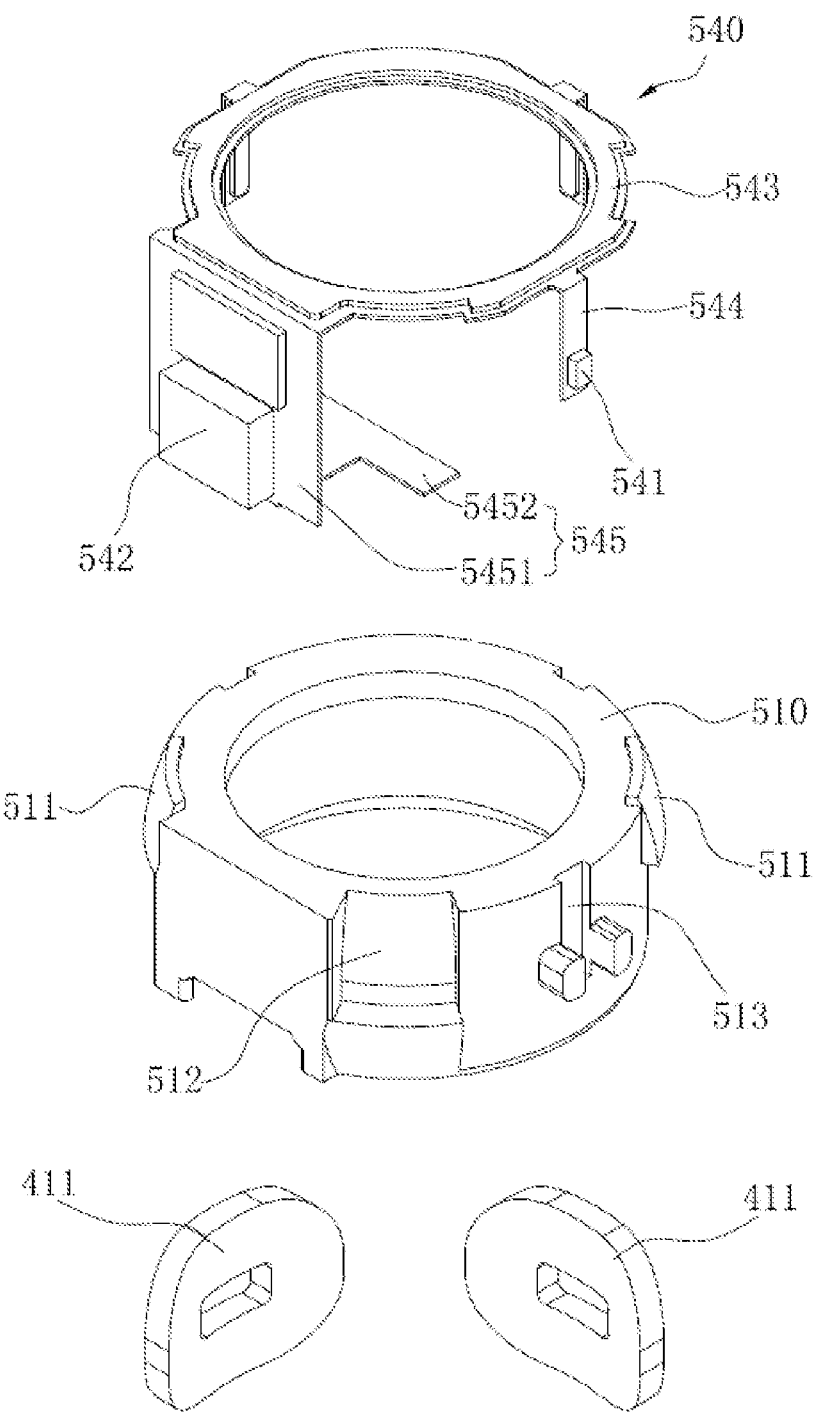
FIG. 9 is an exploded view between an inner ball seat, a third circuit board, and a coil in FIG. 1.

As shown in FIG. 5 and FIG. 8, the two outer ball seats 110 are shaped as a rectangle overall after vertically stacked. The four balls 310 are provided at four corners of the rectangle, respectively.

In some embodiments of the present application, also as shown in FIG. 4, FIG. 5 and FIG. 8, the outer ball seats 110 each include a base 112 and two clamping portions 113. The opening 1121 is formed in the base 112. The clamping portions 113 are connected to the opening 1121 of the base 112. The clamping portions 113 each are provided thereon with one of the rotating fulcrums 111. The two bases 112 are vertically stacked. The balls 310 are provided between the clamping portions 113 and the inner ball seat 510.

In addition, in some embodiments, as shown in FIGS. 4-8, in order to ensure the stability in rotation, grooves 1131 are formed in the clamping portions 113. The balls 310 are provided in the grooves 1131. The rotating fulcrums 111 are defined on inner wall surfaces of the grooves 1131.

In some embodiments of the present application, in order to further lower the assembly difficulty, at least one of the clamping portions 113 in the two outer ball seats 110 is configured to: suspend in the opening 1121 through an elastic arm 114. The elastic arm 114 includes one end connected to the base 112, and the other end connected to the clamping portion 113. As shown in FIG. 5, the elastic arm 114 is provided on the first reference plane, and extends along a radial direction of the reference sphere a. The elastic arm 114 satisfies a relationship: $L \geq 4t$, where L represents a length of the elastic arm 114, and the t represents a thickness of the elastic arm 114. Since the elastic arm 114 satisfying the above relationship has a small spring constant in the radial direction, the component tolerance and assembly tolerance have a low impact on the normal force and friction applied to the balls 310, and therefore, the requirements on the component tolerance and assembly tolerance are reduced, the production difficulty is lowered, the production cost is reduced, and the yield rate is higher.

Figure 12:
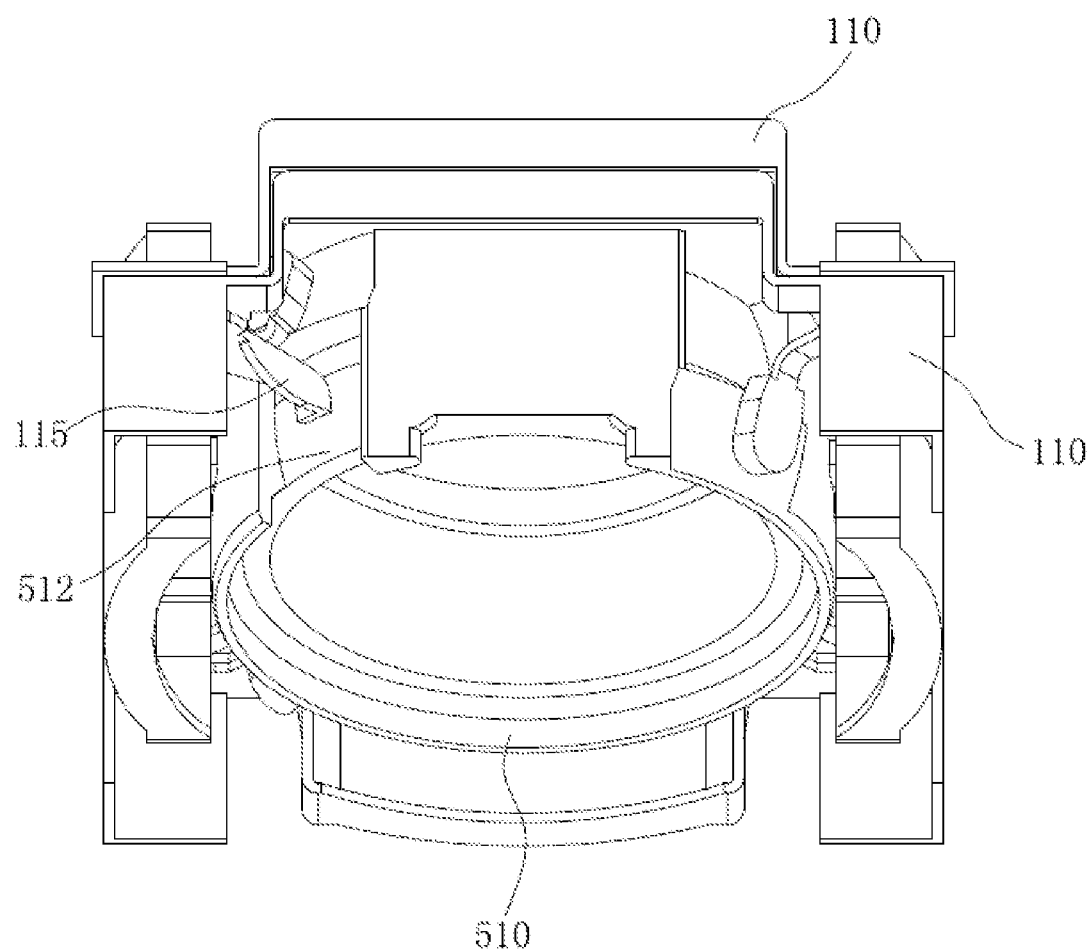
FIG. 12 is an assembled view of an outer ball seat and an inner ball seat in a camera stabilizer module according to an embodiment of the present application.
Figure 13:
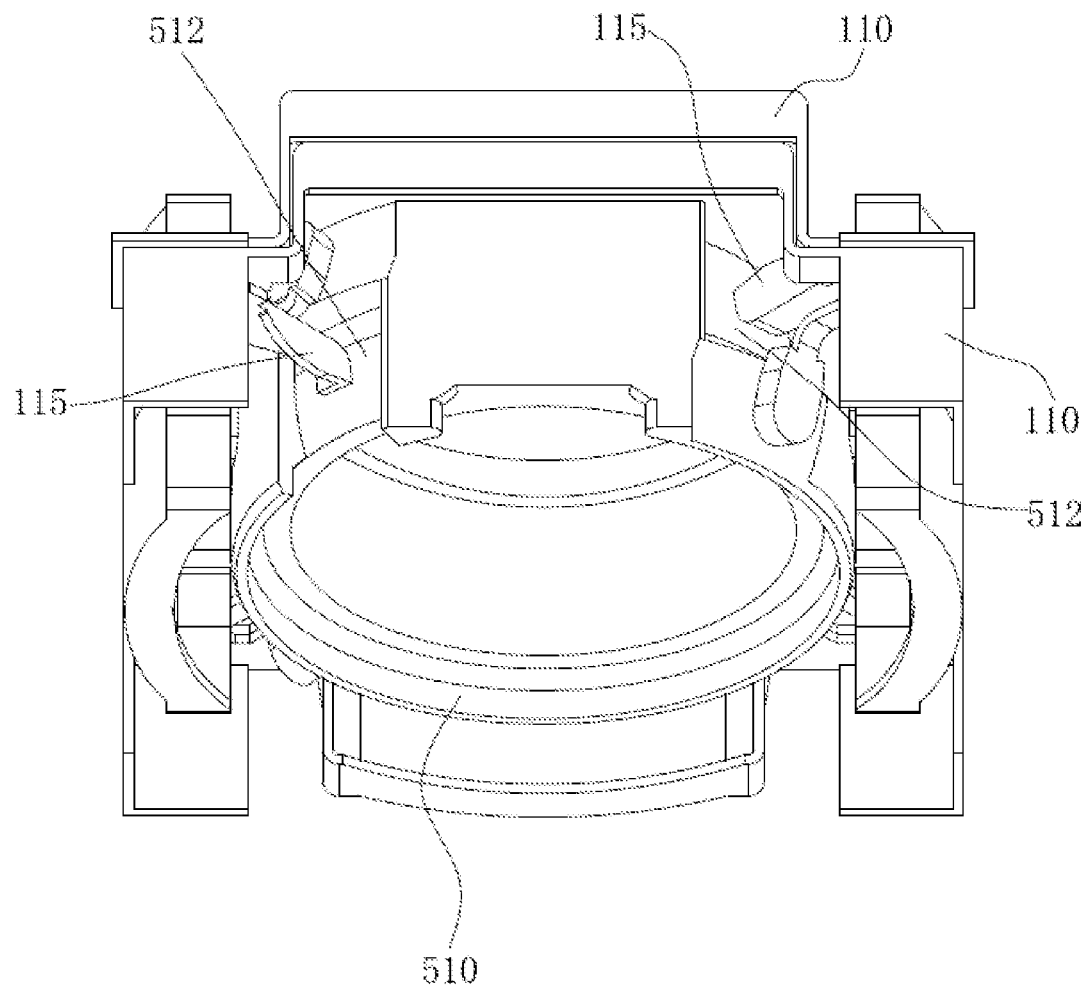
FIG. 13 is an assembled view of an outer ball seat and an inner ball seat in a camera stabilizer module according to an embodiment of the present application.

In some embodiments of the present application, as shown in FIG. 12 and FIG. 13, a stopper 115 is provided on at least one of the outer ball seats 110. A notch 512 is formed in the outer periphery of the inner ball seat 510. The stopper 115 is cooperated with the notch 512 to limit an angle of rotation of the movable structure 500 relative to the fixed structure 100. With mechanical limiting between the stopper 115 on the outer ball seat 110 and the notch 512 in the inner ball seat 510, in case of the movement or dropping of the stabilizer, the movable component does not rotate excessively to affect the reliability of the product in use. FIG. 12 illustrates an implementation in which the stopper 115 is only provided on one outer ball seat 110. FIG. 13 illustrates an implementation in which the stopper 115 is provided on the two outer ball seats 110, respectively.

Exemplarily, in some embodiments of the present application, the driving structure 400 includes at least two actuators 410. The at least two actuators 410 are circumferentially spaced apart along the outer periphery of the inner ball seat 510. Each of the actuators 410 includes a coil 411 and a magnet 412 that are opposite to each other. The coil 411 and the magnet 412 are provided on an inner peripheral wall of the through hole 120 and an outer peripheral wall of the inner ball seat 510, respectively. Specifically, there are two cases, namely the coil 411 is provided on the inner peripheral wall of the through hole 120, and the magnet 412 is provided on the outer peripheral wall of the inner ball seat 510; or the coil 411 is provided on the peripheral outer wall of the inner ball seat 510, and the magnet 412 is provided on the inner peripheral wall of the through hole 120.

In response to the movement of the stabilizer, an electromagnetic force applied to the movable structure 500 can change with a current of the coil 411 to cause rotation of the movable structure 500. When the rotation has a similar amplitude but an opposite direction with the external vibration, the effective stabilization is achieved.

Specifically, each of the actuators 410 can control the movable structure 500 to rotate around one rotational axis. The specific direction of the rotational axis depends on the direction in which the coil 411 is arranged. The rotational axis is concentric with a curved surface where the coil 411 is located. The specific number of the actuators 410 depends on the rotational DOF of the specifically required stabilizer.

In the embodiments shown in FIGS. 1-10, there are two actuators 410, namely the movable structure 500 has two-axis rotational DOFs. In the embodiment shown in FIG. 11, there are three actuators 410, namely the movable structure 500 has three-axis rotational DOFs.

Figure 6:
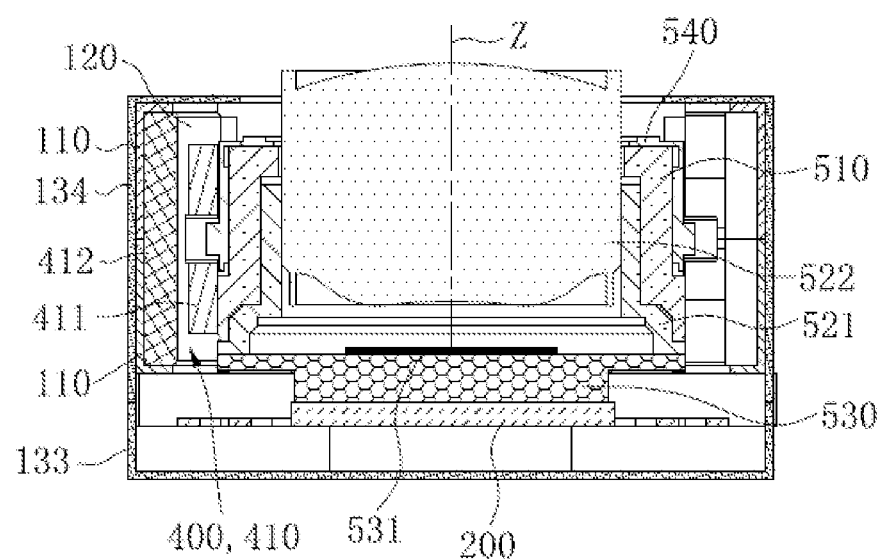
FIG. 6 is a C-C sectional view of FIG. 3.
Figure 7:
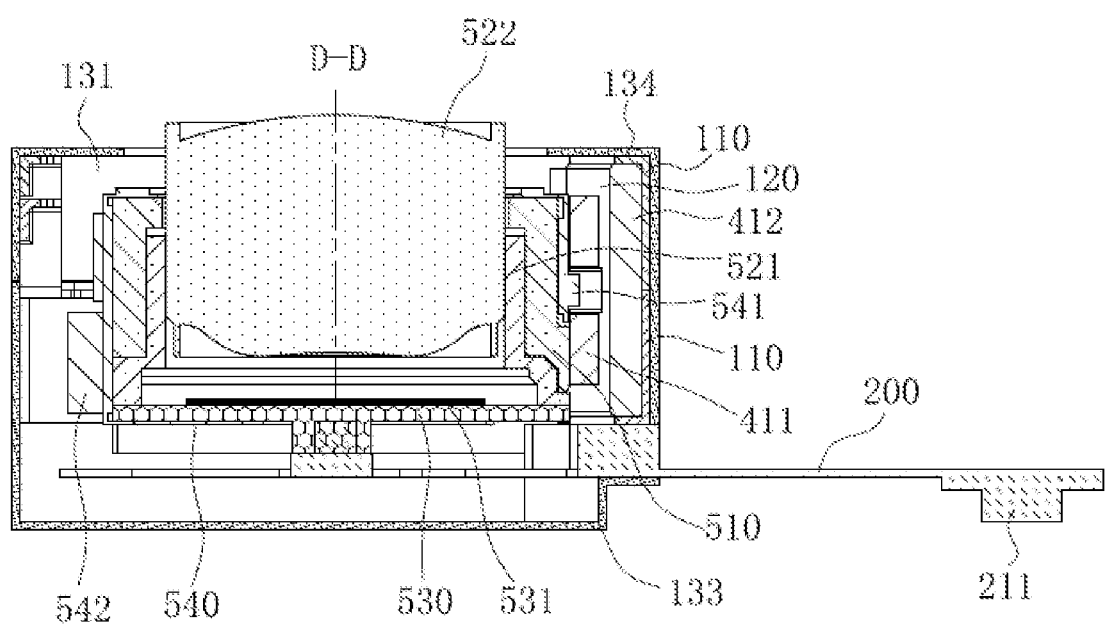
FIG. 7 is a D-D sectional view of FIG. 3.

In some preferred embodiments of the present application, the magnet 412 is provided on the inner peripheral wall of the through hole 120, and the coil 411 is provided on the outer peripheral wall of the inner ball seat 510. In each of the actuators 410, the magnet 412 covers the coil 411 completely, and an outer edge of the magnet 412 protrudes from an outer edge of the coil 411. Specifically, as shown in FIG. 6 and FIG. 7, upper and lower ends of the magnet 412 exceed upper and lower sides of the coil 411. In response to the movement of the stabilizer, the coil 411 may be located in a region with a strong magnetic field to utilize the assembly space more effectively and improve the magnetism. Therefore, the overall structure of the product is more compact, the stabilizing angle is increased, and the power consumption is reduced. In addition, by fixing the magnet 412 on the fixed structure 100, magnetic interference of the nearby magnet 412 on the camera stabilizer module can be reduced effectively to ensure the stabilizing effect.

Figure 11:
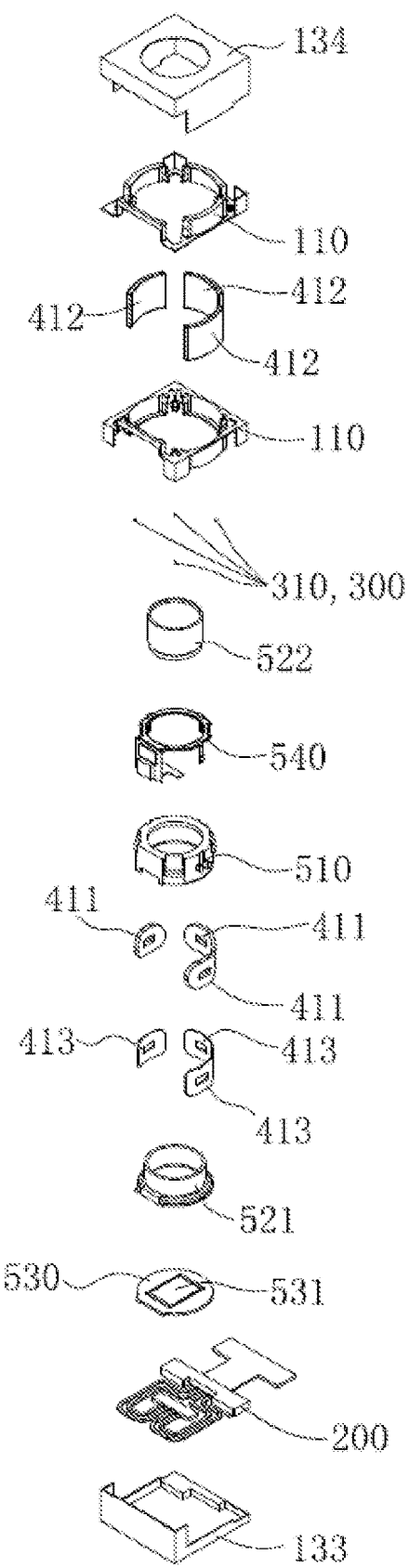
FIG. 11 is an exploded view of a camera stabilizer module according to an embodiment of the present application.

In some embodiments of the present application, as shown in FIG. 11, the three actuators 410 each further include a metal sheet 413. The metal sheet 413 is provided on the outer peripheral wall of the inner ball seat 510, and the coil 411 is located between the metal sheet 413 and the magnet 412. In response to the movement of the stabilizer, the metal sheet 413 rotates relative to the magnet 412 to generate a counter electromotive force and an opposite electromagnetic force to the movement of the stabilizer, which can effectively improve the damping effect in the control system, and achieve the better high-frequency stabilizing effect. In addition, in case of a failure of the electronic system for no electricity, the damping effect still exists, which can effectively reduce the unnecessary movement and noise of the movable structure 500 due to the external vibration.

In some embodiments of the present application, the metal sheet 413 in the above embodiment may be provided on the outer peripheral wall of the inner ball seat 510 and at a peripheral position of the coil 411, namely the actuator 410 includes the coil 411, the metal sheet 413, and the magnet 412 that are arranged oppositely in sequence from inside out.

Likewise, the metal sheet 413 may also be provided at inner and outer sides of the coil 411, respectively.

In some embodiments of the present application, the same effect can also be achieved by only providing the metal sheet 413 in at least one of the actuators 410.

In addition, in some embodiments of the present application, it is to be noted that another actuating device may also be provided in the movable structure 500, to drive the lens 520 to move along the optical axis for an auto-focusing function. For example, a shape memory alloy (SMA) motor is used to drive the lens 520.

Also as shown in FIGS. 1-11, the movable structure 500 further includes a second circuit board 530. The second circuit board 530 is below the lens 520. The second circuit board 530 includes a bottom surface connected to the connecting portion 230 mechanically and electrically, and a top surface provided with an image sensor 531. The first circuit board 200 can be electrically connected to another external control board (for example, a mainboard in the compact mobile device having the photographing function), such that the external control board communicates with the image sensor 531 through the first circuit board 200 to acquire impact information.

In some embodiments of the present application, the lens 520 includes a lens mount 521 and an optical unit 522. The lens mount 521 is connected to an inner periphery of the inner ball seat 510. The optical unit 522 passes through an inner periphery of the lens mount 521, namely the optical unit 522 is connected to the inner ball seat 510 through the lens mount 521. The image sensor 531 is opposite to the optical unit 522.

Further, in some embodiments of the present application, the movable structure 500 further includes a third circuit board 540. The third circuit board 540 is provided on the outer periphery of the inner ball seat 510, and electrically connected to the second circuit board 530. A position sensor 541 and/or an inertial measurement unit 542 is arranged on the third circuit board 540. By reading information of the position sensor 541, closed-loop stabilization control can be implemented to achieve the better stabilization effect. Specifically, the current on the coil 411 is controlled by acquiring positional information of the position sensor 541. In addition, by reading data of the inertial measurement unit 542 which moves with the image sensor 531 together, electronic stabilization can further be implemented to achieve the better stabilization effect.

In some embodiments of the present application, specifically as shown in FIG. 11, the third circuit board 540 further includes an enclosure frame 543, a lower extension plate 545 and a plurality of extension arms 544, so as to simplify the structure and make the product compact overall. The enclosure frame 543 is lapped on a top end surface of the inner ball seat 510. The plurality of extension arms 544 are circumferentially spaced apart on the outer periphery of the inner ball seat 510. Upper ends of the extension arms 544 are connected to the enclosure frame 543. An outer side of each of the extension arms 544 is provided with the position sensor 541. The lower extension plate 545 is circumferentially staggered with the extension arms 544. The lower extension plate 545 includes a lateral plate 5451 and an end plate 5452 that are sequentially connected. Atop side of the lateral plate 5451 is connected to the enclosure frame 543. One side of the end plate 5452 is connected to a bottom side of the lateral plate 5451, and extends inward along a radial direction of the lens 520. The lateral plate 5451 is attached to the outer peripheral wall of the inner ball seat 510. The end plate 5452 is attached to the bottom surface of the second circuit board 530. An outer side of the lateral plate 5451 is provided with the inertial measurement unit 542.

Exemplarily, in some embodiments of the present application, coils 411 are annularly arranged on outer peripheries of the position sensors 541 in one-to-one correspondence, namely the position sensors 541 are provided at middle positions of the coils 411.

Still further, in some embodiments, in order to ensure a more compact structure, a plurality of clamping slots 513 in one-to-one correspondence with the extension arms 544 are formed in an outer peripheral wall of the inner ball seat 510. Tops of the clamping slots 513 extend through a top surface of the inner ball seat 510. The extension arms 544 are accommodated in the clamping slots 513.

In some embodiments of the present application, the fixed structure 100 further includes a housing 130. The housing 130 is provided therein with a mounting cavity 131. A through hole 132 aligned with the mounting cavity 131 is formed in a top of the housing 130. The at least two outer ball seats 110 and the first circuit board 200 are provided in the mounting cavity 131 of the housing 130. The lens 520 is inserted into the through hole 132. The housing 130 can effectively protect the component in the mounting cavity 131.

In addition, for ease of assembly, the housing 130 includes two housing bodies, namely a lower housing body 133 and an upper housing body 134. The upper housing body 134 covers a top of the lower housing body 133. The mounting cavity 131 is defined between the upper housing body 134 and the lower housing body 133. A part of the fixed portion 210 is clamped between the upper housing body 134 and the lower housing body 133. In response to specific assembly, movable components are assembled into whole. The outer ball seats 110 are assembled sequentially on the outer periphery of the inner ball seat 510 through the balls 310. The first circuit board 200 is connected to the second circuit board 530. At last, the upper housing body 134 covers the lower housing body 133.

Exemplarily, the upper housing body 134 and the lower housing body 133 are connected by dispensing or welding.

In addition, in some embodiments of the present application, for ease of connection of external circuits, a part of the fixed portion 210 is stretched out of the housing 130, and an outer region of the fixed portion 210 stretched out of the housing 130 is provided with a socket 211.

Figure 10:
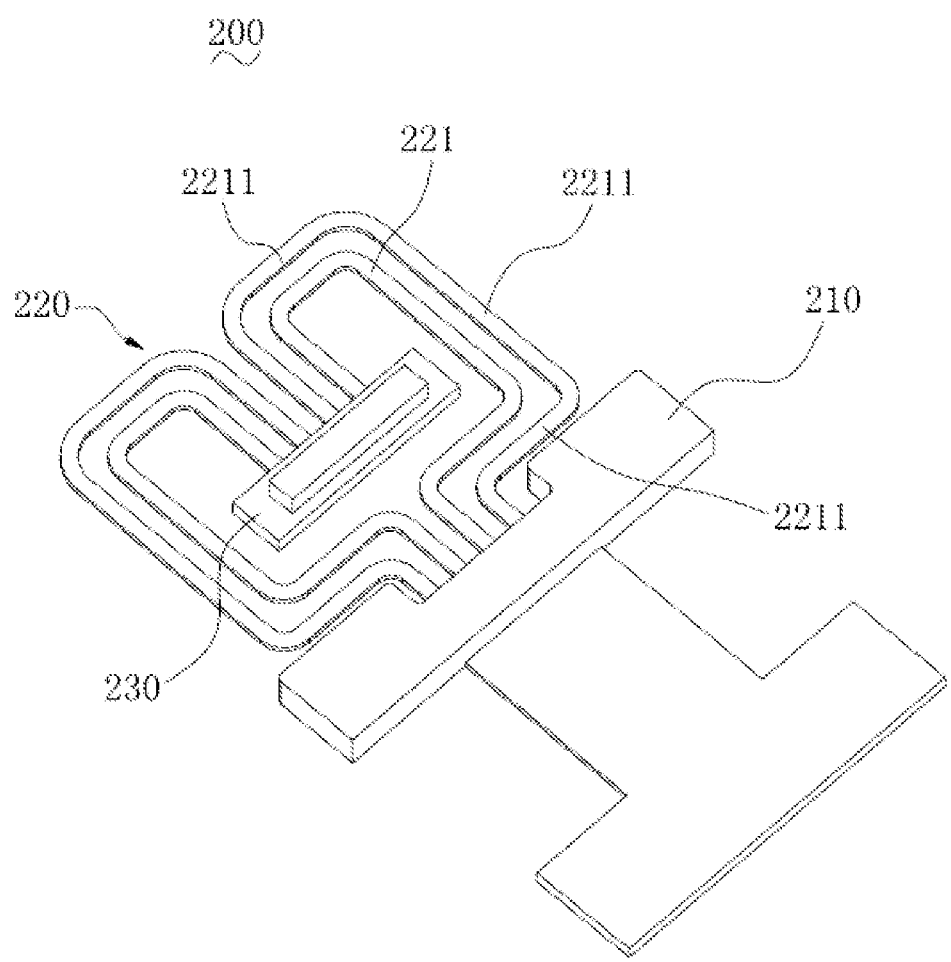
FIG. 10 is a structural view of a first circuit board in FIG. 1.

In some embodiments of the present application, as shown in FIG. 10, the elastic portion 220 includes at least two elastic wires 221. The at least two elastic wires 221 are provided in the mounting cavity 131, and located on a second reference plane. Each of the elastic wires 221 includes one end connected to the fixed portion 210, and the other end connected to the connecting portion 230, and includes at least two connecting segments 2211 sequentially connected in a bending manner. By providing the at least two elastic wires 221 on the same second reference plane, desirable damping effect and resilience can be achieved.

Further, in some embodiments of the present application, also as shown in FIG. 10, at least two spaced-apart elastic wires 221 are symmetrically distributed at two sides of the connecting portion 230 on the elastic portion 220. The second reference plane is perpendicular to an optical axis Z of the lens 520.

Figure 14:
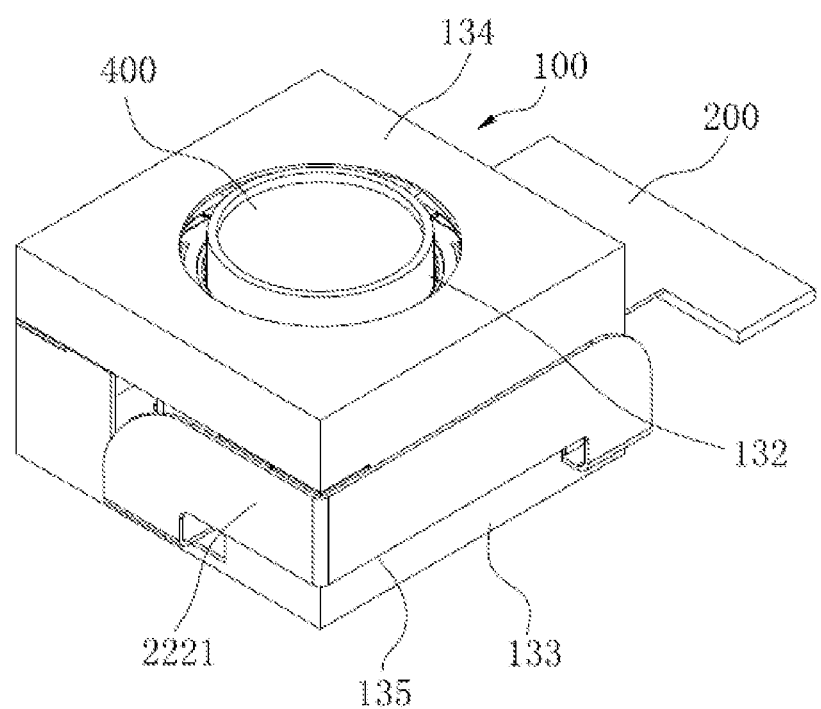
FIG. 14 is a structural view of a camera stabilizer module according to an embodiment of the present application.
Figure 15:
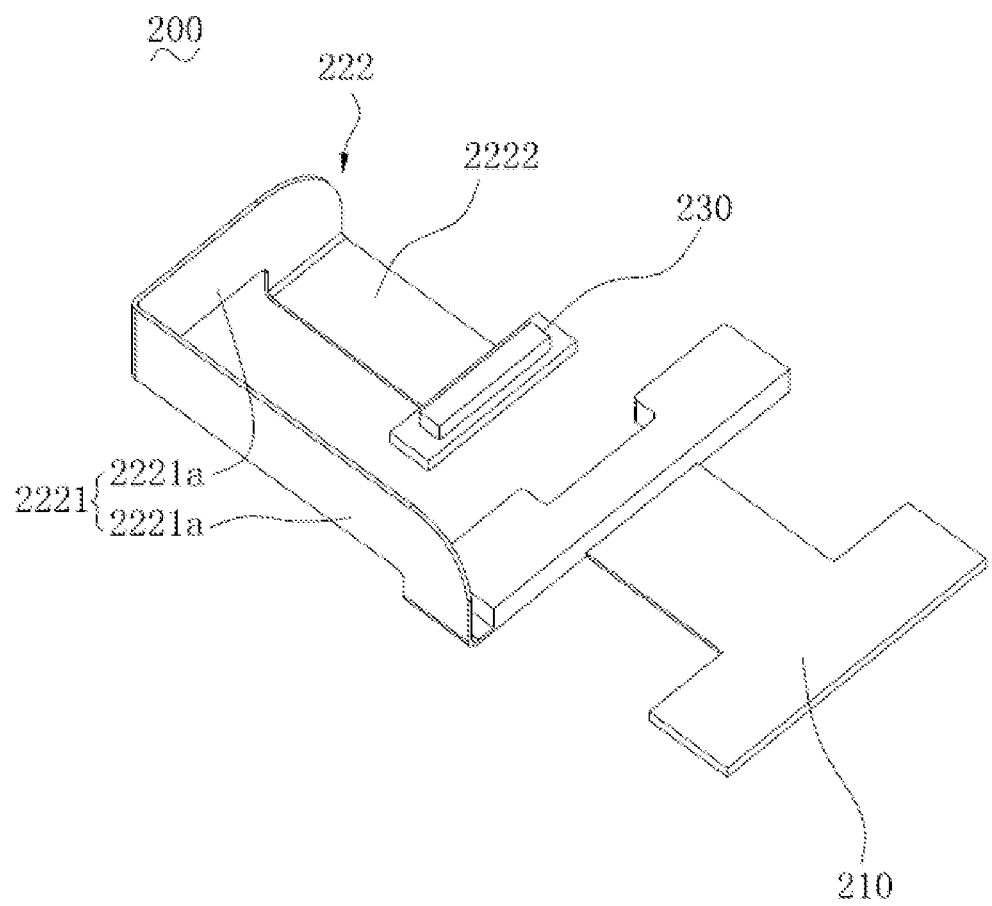
FIG. 15 is a structural view of a first circuit board in FIG. 14.

In other embodiments, as shown in FIG. 14 and FIG. 15, a passage hole 135 is defined between the upper housing body 134 and the lower housing body 133. The passage hole 135 is located outside the housing 130 and aligned with the mounting cavity 131. The elastic portion 220 includes an elastic plate 222. The elastic plate 222 includes one end connected to the fixed portion 210, and the other end connected to the connecting portion 230, and includes a first plate body 2221 and a second plate body 2222 that are sequentially connected. A plane of the first plate body 2221 is parallel to an optical axis Z of the lens 520. A plane of the second plate body 2222 is perpendicular to the optical axis Z. One side of the first plate body 2221 is connected to the fixed portion 210. The other side of the first plate body 2221 is connected to one side of the second plate body 2222. The other side of the second plate body 2222 is connected to the connecting portion 230. The second plate body 2222 is provided in the passage hole 135. The camera stabilizer module has a simpler structure and a higher space utilization rate, can effectively reduce the size of the whole product, and can ensure the desirable damping effect and resilience.

Still further, also as shown in FIG. 15, in order to achieve the better damping effect and resilience, the first plate body 2221 includes two wall surfaces 2221*a* that are sequentially connected, and the two wall surfaces 2221*a* are perpendicular to each other in some embodiments of the present application.

In addition, in the embodiment of the present application, it is to be noted that there is a moving space between the connecting portion 230 and a bottom surface of the lower housing body 133, so as to ensure that the connecting portion 230 can rotate relative to the fixed portion 210.

In some embodiments of the present application, the housing 130 may be of other shapes, such as an integral structure, a structure including more than two housing bodies stacked vertically, and a structure including two or more housing bodies covered laterally, which is not defined in the present application.

In some preferred embodiments of the present application, more than four balls 310 may be provided between the movable structure 500 and the fixed structure 100, namely at least one of the outer ball seats 110 is connected to three or more balls 310. In the present application, at least four balls 310 are provided, which not only implements stable connection between the movable structure 500 and the fixed structure 100, but also simplifies the structure.

In addition, in some embodiments of the present application, it is to be noted that the at least two split outer ball seats 110 (two or more outer ball seats) of the camera stabilizer module may be assembled in other forms (not specifically shown in the figures). Exemplarily, a bayonet is formed in one side of each of the outer ball seats 110. The ball 310 seats are sequentially connected end to end, and the bayonets are aligned with each other to define the through hole 120. In response to the assembly, the outer ball seats 110 are sequentially connected along the circumferential direction, such that the movable structure 500 is rotatably connected to the balls 310 through the outer ball seats 110.

In conclusion, according to the camera stabilizer module provided by the embodiment of the present application, a fixed structure 100 is rotatably connected to a movable structure 500 through a first circuit board 200 with an elastic portion 220 and at least four balls 310. Under an action of a driving structure 400, the movable structure 500 can rotate multiaxially relative to the fixed structure 100, and different postures have a low impact on the stabilizing performance. In addition, the fixed structure 100 includes at least two split outer ball seats 110, and each of the outer ball seats 110 is provided thereon with rotating fulcrums 111 connected to the balls 310. In response to assembly, the outer ball seats 110 are sequentially provided on an outer periphery of the movable structure 500 through the balls 310, and then assembled with other components, thereby effectively reducing the assembly difficulty for mass production of the product.

The specification discloses the present application with the accompanying drawings, and also enables those skilled in the art to practice the present application, including making and using any devices or systems, using appropriate materials and performing any incorporated methods. The scope of the present application is defined by the claims, and includes other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A camera stabilizer module, comprising:
   a fixed structure comprising at least two split outer ball seats, wherein the at least two outer ball seats are connected to jointly define a through hole, rotating fulcrums are provided on each of the outer ball seats, and there are at least four rotating fulcrums in total that are located in the through hole;
   a first circuit board provided with a fixed portion, an elastic portion, and a connecting portion that are sequentially connected, the fixed portion being connected to the fixed structure;
   a connecting structure comprising a plurality of balls, which are quantitatively consistent with the rotating fulcrums, and rotatably connected to the rotating fulcrums in one-to-one correspondence;
   a movable structure inserted into the through hole, wherein a bottom of the movable structure is connected to the connecting portion, the movable structure comprises an inner ball seat and a lens on the inner ball seat, at least four spherical segments in one-to-one correspondence with the balls are arranged on an outer periphery of the inner ball seat, the spherical segments are concentric with a center of rotation, and the balls abut against the spherical segments; and
   a driving structure capable of driving the movable structure to rotate around at least two rotational axes.

2. The camera stabilizer module according to claim 1, wherein the fixed structure comprises two vertically stacked outer ball seats, a vertical opening is formed in each of the outer ball seats, the two openings are aligned with each other to define the through hole, and the outer ball seats each are provided thereon with at least two rotating fulcrums; and
   a plane passing through the center of rotation and perpendicular to an optical axis of the lens is defined as a first reference plane, the rotating fulcrums on the upper outer ball seat are located above the first reference plane, and the rotating fulcrums on the lower outer ball seat are located below the first reference plane.

3. The camera stabilizer module according to claim 2, wherein the spherical segments each have a same diameter; the outer ball seats each are provided thereon with two rotating fulcrums; and included angles between tangent planes at places where the spherical segments contact the balls and the optical axis of the lens are the same; and
   from a top view, the two rotating fulcrums on the upper outer ball seat and the center of rotation are located on a first reference straight line, and the two rotating fulcrums on the lower outer ball seat and the center of rotation are located on a second reference straight line, wherein the first reference straight line is perpendicular to the second reference straight line.

4. The camera stabilizer module according to claim 2, wherein the outer ball seats each comprise:
   a base, the opening being formed in the base; and
   at least two clamping portions connected to the opening of the base, wherein grooves are formed in the clamping portions, the balls are provided in the grooves, and the rotating fulcrums are defined on inner wall surfaces of the grooves; and
   the two bases are vertically stacked.

5. The camera stabilizer module according to claim 4, wherein at least one of the clamping portions is configured to:
   suspend in the opening through an elastic arm, wherein the elastic arm comprises one end connected to the base and the other end connected to the clamping portion, and satisfies a relationship: $L \geq 4t$, wherein L represents a length of the elastic arm, and t represents a thickness of the elastic arm.

6. The camera stabilizer module according to claim 1, wherein a stopper is provided on at least one of the outer ball seats, a notch is formed in the outer periphery of the inner ball seat, and the stopper is cooperated with the notch to limit an angle of rotation of the movable structure relative to the fixed structure.

7. The camera stabilizer module according to claim 1, wherein the driving structure comprises at least two actuators, and the at least two actuators are circumferentially spaced apart along the outer periphery of the inner ball seat; and
   each of the actuators comprises a coil and a magnet that are opposite to each other, and the coil and the magnet are provided on an inner peripheral wall of the through hole and an outer peripheral wall of the inner ball seat, respectively.

8. The camera stabilizer module according to claim 7, wherein the magnet is provided on the inner peripheral wall of the through hole, and the coil is provided on the outer peripheral wall of the inner ball seat.

9. The camera stabilizer module according to claim 8, wherein in each of the actuators, the magnet covers the coil completely, and an outer edge of the magnet protrudes from an outer edge of the coil.

10. The camera stabilizer module according to claim 8, wherein at least one of the actuators further comprises a metal sheet, the metal sheet is provided on the outer peripheral wall of the inner ball seat, and the metal sheet is provided on an outer periphery and/or an inner periphery of the coil.

11. The camera stabilizer module according to claim 1, wherein the movable structure further comprises:
    a second circuit board below the lens, and comprising a bottom surface connected to the connecting portion mechanically and electrically, and a top surface provided with an image sensor.

12. The camera stabilizer module according to claim 11, wherein the lens comprises:
    a lens mount connected to an inner periphery of the inner ball seat; and an optical unit passing through an inner periphery of the lens mount, the image sensor being opposite to the optical unit.

13. The camera stabilizer module according to claim 11, wherein the movable structure further comprises:
   a third circuit board provided on an outer periphery of the inner ball seat, and electrically connected to the second circuit board, a position sensor and an inertial measurement unit being arranged on the third circuit board.

14. The camera stabilizer module according to claim 13, wherein the third circuit board comprises:
   an enclosure frame lapped on a top end surface of the inner ball seat; and
   a plurality of extension arms circumferentially spaced apart on the outer periphery of the inner ball seat, upper ends of the extension arms being connected to the enclosure frame, and an outer side of each of the extension arms being provided with the position sensor.

15. The camera stabilizer module according to claim 14, wherein a plurality of clamping slots in one-to-one correspondence with the extension arms are formed in an outer peripheral wall of the inner ball seat, tops of the clamping slots extend through a top surface of the inner ball seat, and the extension arms are accommodated in the clamping slots.

16. The camera stabilizer module according to claim 14, wherein the third circuit board further comprises:
   a lower extension plate circumferentially staggered with the extension arms, wherein the lower extension plate comprises a lateral plate and an end plate that are sequentially connected; a top side of the lateral plate is connected to the enclosure frame; one side of the end plate is connected to a bottom side of the lateral plate, and extends along a radial direction of the lens; the lateral plate is attached to the outer peripheral wall of the inner ball seat; the end plate is attached to the bottom surface of the second circuit board; and an outer side of the lateral plate is provided with the inertial measurement unit.

17. The camera stabilizer module according to claim 11, wherein the movable structure further comprises:
   a third circuit board provided on an outer periphery of the inner ball seat, and electrically connected to the second circuit board, a position sensor or an inertial measurement unit being arranged on the third circuit board.

18. The camera stabilizer module according to claim 1, wherein the fixed structure further comprises:
   a housing provided therein with a mounting cavity, wherein a through hole is aligned with the mounting cavity is formed in a top of the housing; the at least two outer ball seats and the first circuit board are provided in the mounting cavity of the housing; and the lens is inserted into the through hole.

19. The camera stabilizer module according to claim 18, wherein a passage hole is formed outside the housing, the passage hole is aligned with the mounting cavity, and the elastic portion comprises:
   an elastic plate comprising one end connected to the fixed portion, and the other end connected to the connecting portion, and comprising a first plate body and a second plate body that are sequentially connected, wherein a plane of the first plate body is parallel to an optical axis of the lens, a plane of the second plate body is perpendicular to the optical axis, one side of the first plate body is connected to the fixed portion, the other side of the first plate body is connected to one side of the second plate body, the other side of the second plate body is connected to the connecting portion, the second plate body is provided in the passage hole, the first plate body comprises two wall surfaces that are sequentially connected, and the two wall surfaces are perpendicular to each other.

20. The camera stabilizer module according to claim 1, wherein the elastic portion comprises:
   at least two elastic wires located on a second reference plane, each of the elastic wires comprising one end connected to the fixed portion, and the other end connected to the connecting portion, and comprising at least two connecting segments sequentially connected in a bending manner.

21. The camera stabilizer module according to claim 20, wherein the at least two spaced-apart elastic wires are symmetrically distributed at two sides of the connecting portion; and
   the second reference plane is perpendicular to an optical axis of the lens.

* * * * *